(12) United States Patent
Kugele

(10) Patent No.: US 11,453,457 B2
(45) Date of Patent: Sep. 27, 2022

(54) MAIN BODY FRAME FOR ELECTRIC MOTORCYCLE AND ELECTRIC MOTORCYCLE

(71) Applicant: E-MOOVEE GMBH, Gräfelfing (DE)

(72) Inventor: Christian Kugele, Gräfelfing (DE)

(73) Assignee: BYKSTAR MOBILITY AKTIENGESELLSCHAFT

( * ) Notice: Subject to any disclaimer, the term of this patent is extended or adjusted under 35 U.S.C. 154(b) by 0 days.

(21) Appl. No.: 17/414,961

(22) PCT Filed: Oct. 1, 2019

(86) PCT No.: PCT/EP2019/076628
§ 371 (c)(1),
(2) Date: Jun. 17, 2021

(87) PCT Pub. No.: WO2020/135938
PCT Pub. Date: Jul. 2, 2020

(65) Prior Publication Data
US 2021/0354774 A1 Nov. 18, 2021

(30) Foreign Application Priority Data

Dec. 28, 2018 (EP) .................................... 18001011

(51) Int. Cl.
*B62K 11/04* (2006.01)
*B62J 43/20* (2020.01)
(Continued)

(52) U.S. Cl.
CPC ................. *B62K 11/04* (2013.01); *B62J 1/08* (2013.01); *B62J 43/16* (2020.02); *B62J 43/20* (2020.02);
(Continued)

(58) Field of Classification Search
CPC ........ B62K 2204/00; B62K 3/04; B62K 3/08; B62K 3/10; B62J 1/08; B62J 43/16; B62J 43/20
(Continued)

(56) References Cited

U.S. PATENT DOCUMENTS 10,611,425 B2 * 4/2020 Miyashiro .............. H01M 50/20
10,836,451 B2 * 11/2020 Karashima .............. B62K 19/28
(Continued)

FOREIGN PATENT DOCUMENTS

CN 104787189 A 7/2015
EP 2096023 A2 9/2009
(Continued)

OTHER PUBLICATIONS

Search Report for International Patent Application PCT/EP2019/076628, dated Jul. 2, 2020.

*Primary Examiner* — Tony H Winner
(74) *Attorney, Agent, or Firm* — Fresh IP PLC; Clifford D. Hyra; Aubrey Y. Chen

(57) ABSTRACT

A main body frame (100) for an electric motorcycle comprises a front fork support member (101) with a front fork through hole for loading a pivot stem of a front fork (200), the front fork through hole has a pivotal axis arranged in a central plane (P) of the main body frame; the main body frame further comprises a right and a left frame part (102, 105) arranged on opposite sides of the central plane of the main body frame, each having an elongated shape and being formed of an upper part (102*a*, 102*b*) and a lower part (102*c*, 102*d*), respectively at different sides of an elongation direction changing portion (102*e*), a first buffer member (120) attached, at opposite sides thereof, to the right and the left frame part, and crossing the central plane. wherein starting from the respective elongation direction changing portions thereof. the upper parts of the left and the right frame part
(Continued)

extend inwardly towards the central plane so as to embrace the front fork support member, and are attached to opposite sides of the front fork support member, and a largest width (a7) of the main body frame in a width direction (Z) perpendicular to the central plane is 10 cm or more and 30 cm or less.

14 Claims, 13 Drawing Sheets

(51) Int. Cl.
 B62J 43/16 (2020.01)
 B62J 1/08 (2006.01)
 B62K 19/24 (2006.01)
 B62K 21/02 (2006.01)
 B62M 7/12 (2006.01)
 B62J 43/30 (2020.01)

(52) U.S. Cl.
 CPC .............. B62K 19/24 (2013.01); B62K 21/02 (2013.01); B62M 7/12 (2013.01); B62J 43/30 (2020.02)

(58) Field of Classification Search
 USPC ....................................... 280/281.1
 See application file for complete search history.

(56) References Cited

U.S. PATENT DOCUMENTS

| | | | |
|---|---|---|---|
| 10,946,917 B2* | 3/2021 | Enami | B62J 1/08 |
| 11,124,259 B2* | 9/2021 | Talavasek | B62J 43/28 |
| 2009/0212530 A1* | 8/2009 | Sasnowski | B62K 25/005 280/288.3 |
| 2010/0078247 A1* | 4/2010 | Sasage | B62M 7/12 180/220 |
| 2012/0242058 A1* | 9/2012 | Haimoff | B62K 19/16 280/281.1 |
| 2013/0032424 A1* | 2/2013 | Sand | B60K 1/04 180/220 |
| 2013/0216885 A1* | 8/2013 | Kawatani | H01M 50/20 429/100 |
| 2013/0233634 A1* | 9/2013 | Matsuda | B62K 11/02 180/220 |
| 2014/0367184 A1* | 12/2014 | Matsuda | B60L 50/51 180/220 |
| 2015/0075889 A1 | 3/2015 | Eguchi | |
| 2015/0344093 A1* | 12/2015 | Inoue | B62J 43/28 180/220 |
| 2016/0039489 A1 | 2/2016 | Platz | |
| 2016/0347199 A1* | 12/2016 | Mochizuki | B62K 25/283 |
| 2017/0088013 A1* | 3/2017 | Shimizu | B60L 50/51 |
| 2017/0327175 A1* | 11/2017 | Moore | B62K 19/08 |
| 2018/0065705 A1* | 3/2018 | Choi | B62M 6/55 |
| 2019/0329836 A1* | 10/2019 | Buell | B62K 19/46 |
| 2020/0031419 A1* | 1/2020 | Dennert | B62K 11/04 |

FOREIGN PATENT DOCUMENTS

| | | |
|---|---|---|
| JP | 2012086690 A | 5/2012 |
| JP | 2018058391 A | 4/2018 |

* cited by examiner

MAIN BODY FRAME FOR ELECTRIC MOTORCYCLE AND ELECTRIC MOTORCYCLE

BACKGROUND OF THE INVENTION

Field of the Invention

The present invention relates to a main body frame for an electric motorcycle and an electric motorcycle comprising the main body frame.

Description of the Related Art

In the art, electric motorcycles are often developed based on the overall design of combustion engine motorcycles, wherein the frames are retained with only minor adaptations. Respective motorcycle frames are known, which are made from metal tubes which are suitably bent and welded together. Such concept does not take full account of all potential of an electric motorcycle.

Also for an electric motorcycle, the frame has to be sufficiently rigid for coping with extreme situations and needs to have enough strength to sustain impacts to a certain amount, for example caused by falls. To fulfill these requirements, the tubes are usually made from steel such as ChroMoly steel. Steel has a relatively high density of about 7.75 to 8.05 $g/cm^3$. Therefore, a frame made from steel tubes is heavy and adds significantly to the weight of the electric motorcycle.

Such a conventional electric motorcycle is therefore relatively heavy, typically above 100 kg, for instance, 130 kg, and thus difficult to handle, in particular for beginners but also for professionals, for instance, when used for jumps in trial races. Moreover, it is difficult to transport because it cannot be lifted by a single person and a common bicycle rack for transportation by car is not designed for such weight. Therefore, it is desirable to reduce the weight of the electric motorcycle and of its frame, especially the main body frame, as far as possible while maintaining a sufficiently high strength.

Moreover, as mentioned, steel tubes are usually welded together which does not allow to exchange parts. For example, in case of an accident, it can be desirable to replace only a damaged portion of the frame. It may also be desirable to have a motorcycle that allows adaptation to different driving situations, for instance to change the steering head so as to adjust the inclination of the front fork. This is hardly feasible with tubes which are welded together. Furthermore, in order to prevent the frame from becoming overly heavy, the side walls of the tubes are usually made as thin as possible with regard to structural stability. This makes it difficult to removably secure the tubes to each other in a stable manner since the material is too thin to provide a threaded portion of an appropriate length for engaging a screw. The material is also too thin to receive the head of a countersunk head screw.

In addition, the local application of heat during welding can weaken the overall strength of the otherwise suitable materials such that materials for welded frames are undesirably limited, for instance, to specific steels. Furthermore, welding damages a protective anodization.

On the other hand, electric bicycles are known. Electric bicycles usually have a power output of much less than 1 kW, for instance, 250 W, whereas electric motorcycles have a power output of at least 3 kW, usually more than 5 kW, for instance 6 kW. Therefore, electric bicycles require much smaller and lighter battery and motor units than electric motorcycles. Consequently, forces exercised by the masses of these units, for instance, when accelerating, steering, driving on a bumpy road, or jumping, are much smaller and the requirements on the strength of the frame thus much lower than for an electric motorcycle. Hence, electric bicycles can be made relatively light, typically below 25 kg, for instance 13 kg, by having a frame with only a central tubular column. Moreover, an electric bicycle normally has treading pedals as a main power source for driving and the electric motor is only auxiliary. Thus, to allow ergonomic treading, the electric bicycle has to be very thin, especially at the portion where the driver's knees are placed, compared to an electric motorcycle having only an electric motor as a power source.

A frame with only a central tubular column is, however, not suitable for an electric motorcycle with much heavier and larger battery and motor unit. Conventional electric motorcycles therefore have welded-together left and right tubular columns fanning out from a steering head in a rearward direction. This is more stable and provides sufficient space for the motor and battery unit, but increases the weight of the frame as compared to a single central column and also makes the conventional electric motorcycle relatively broad in width. In particular, the diameter of cavities of the tubes also adds to the width of the frame, which typically results in a frame width of more than 30 cm. A broad motorcycle is inconvenient for a person to push and is less ergonomic for requiring a broad knee placement during driving.

In sum, it is desirable, to provide a main body frame for an electric motorcycle that is light in weight and narrow in width while, at the same time, providing enough space for a motor and battery unit and sufficient strength. Moreover, it is desirable to be able to replace parts thereof. And for a corresponding electric motorcycle, it is desirable to have an ergonomic handling as well as a modular design adaptable to different driving situations, such as streets or cross-country, while retaining most parts of the frame with interest to costs.

SUMMARY OF THE INVENTION

According to an aspect of the present invention, a main body frame according to claims 1 to 14 is provided.

According to another aspect of the present invention, an electric motorcycle is provided.

The present invention provides improvements to the above described disadvantages of the known art. The main body frame according to the present invention is particularly light in weight and/or narrow in width such that handling of an electric motorcycle with this main body frame is improved. Moreover, the main body frame can be produced without welding, for example by using screws, and preferably allows the motorcycle to be provided with a modular design.

Further features of the present invention will become apparent from the following description of the exemplary embodiments with reference to the attached drawings.

DESCRIPTION OF THE EMBODIMENTS

First Embodiment

Figure 1:
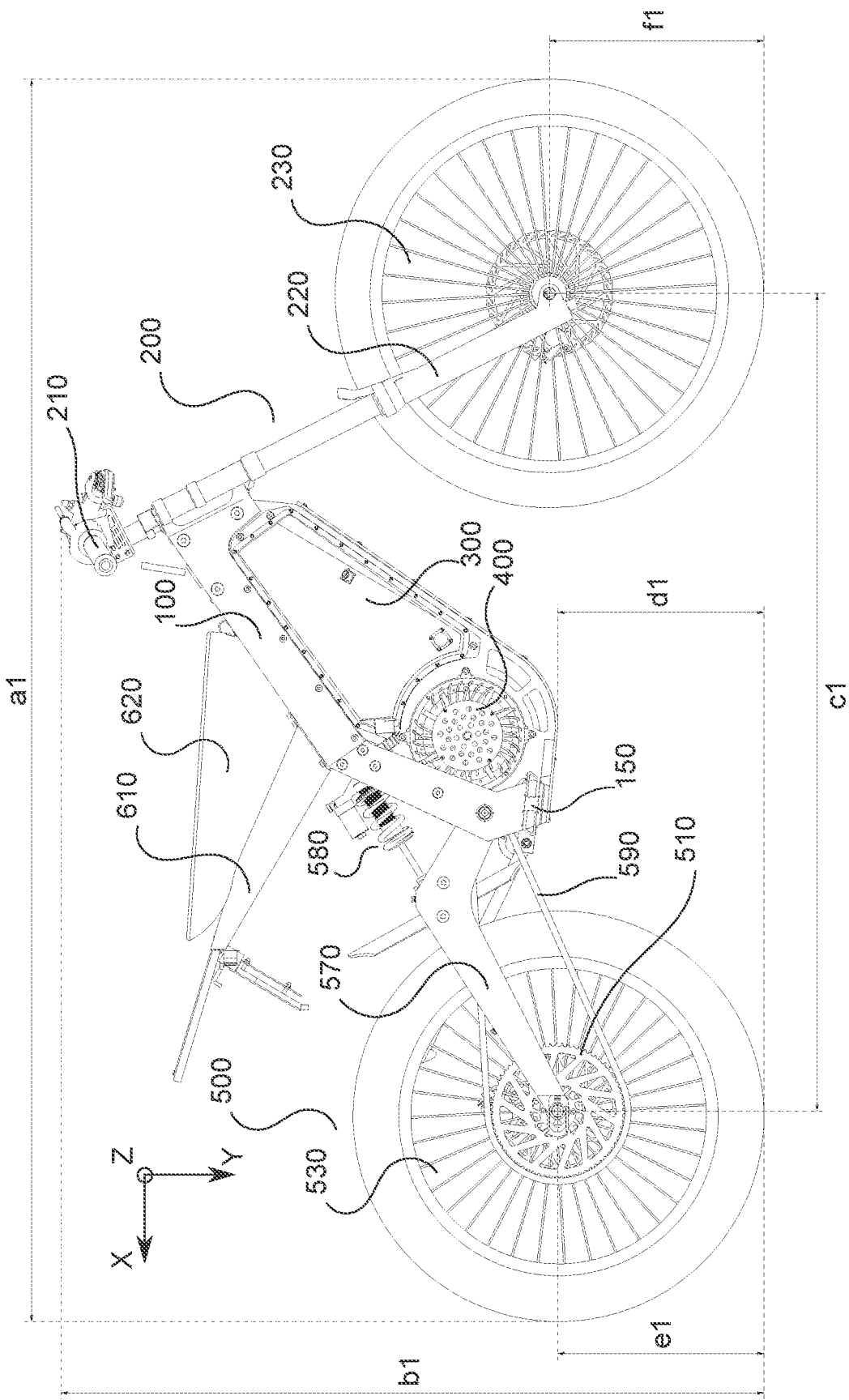
FIG. 1 is a side view illustrating an electric motorcycle according to a first embodiment of the present invention.
Figure 2:
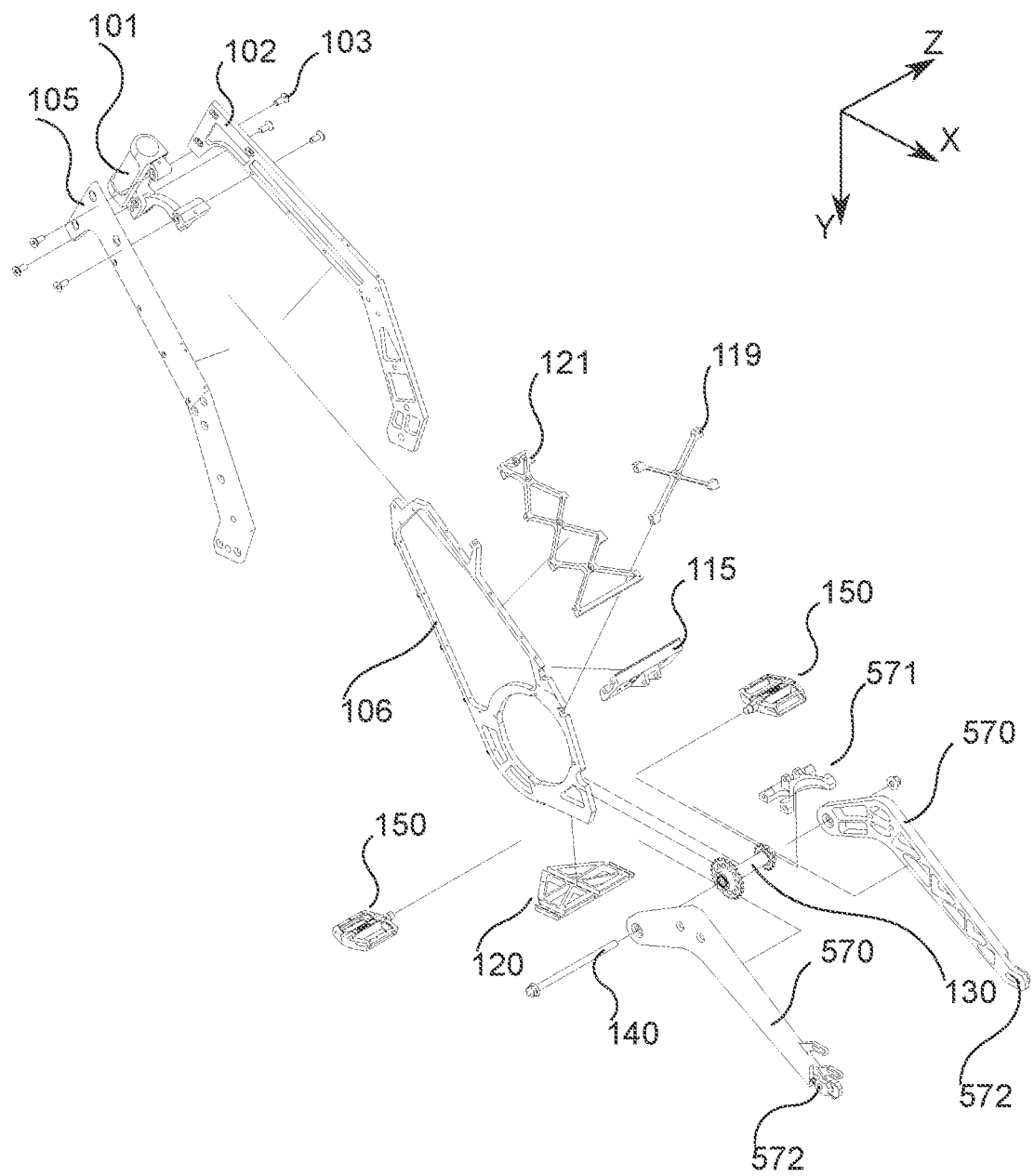
FIG. 2 is an exploded perspective view illustrating a main body frame according to the first embodiment of the present invention in relation to further parts.
Figure 3:
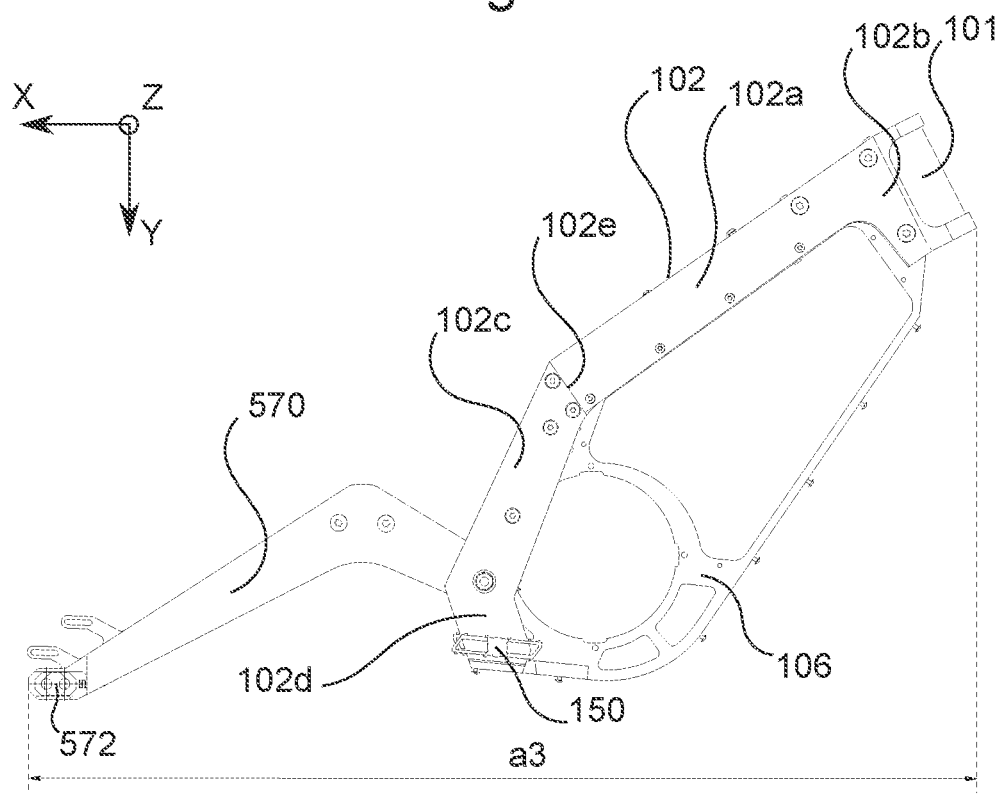
FIG. 3 is a side view illustrating a main body frame according to the first embodiment of the present invention in relation to further parts.
Figure 4:
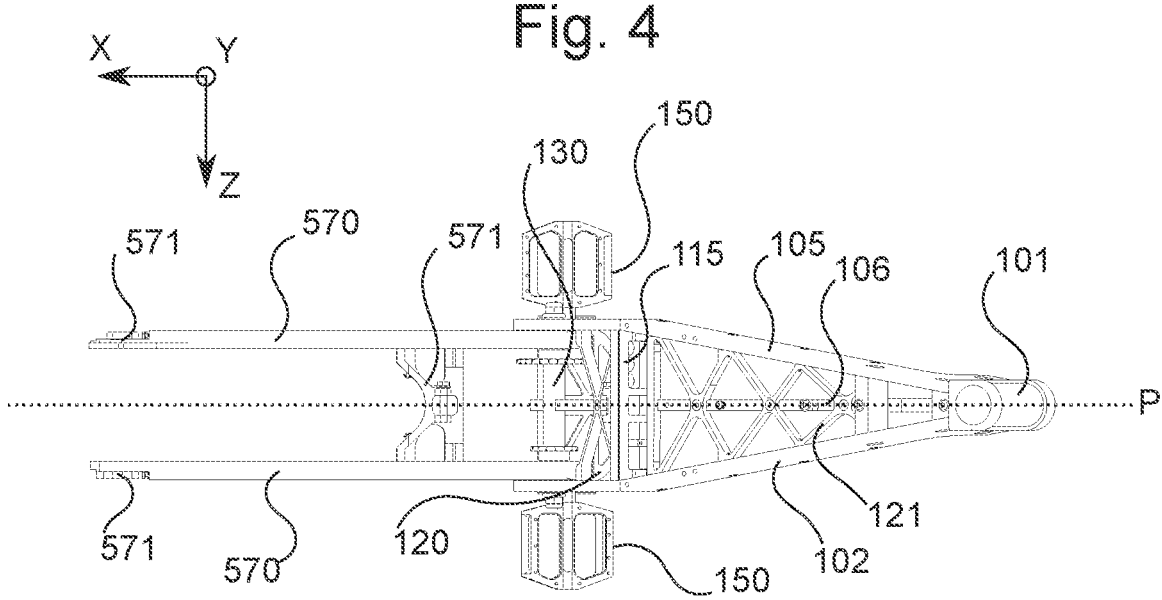
FIG. 4 is a top view illustrating a main body frame according to the first embodiment of the present invention in relation to further parts.
Figure 5:
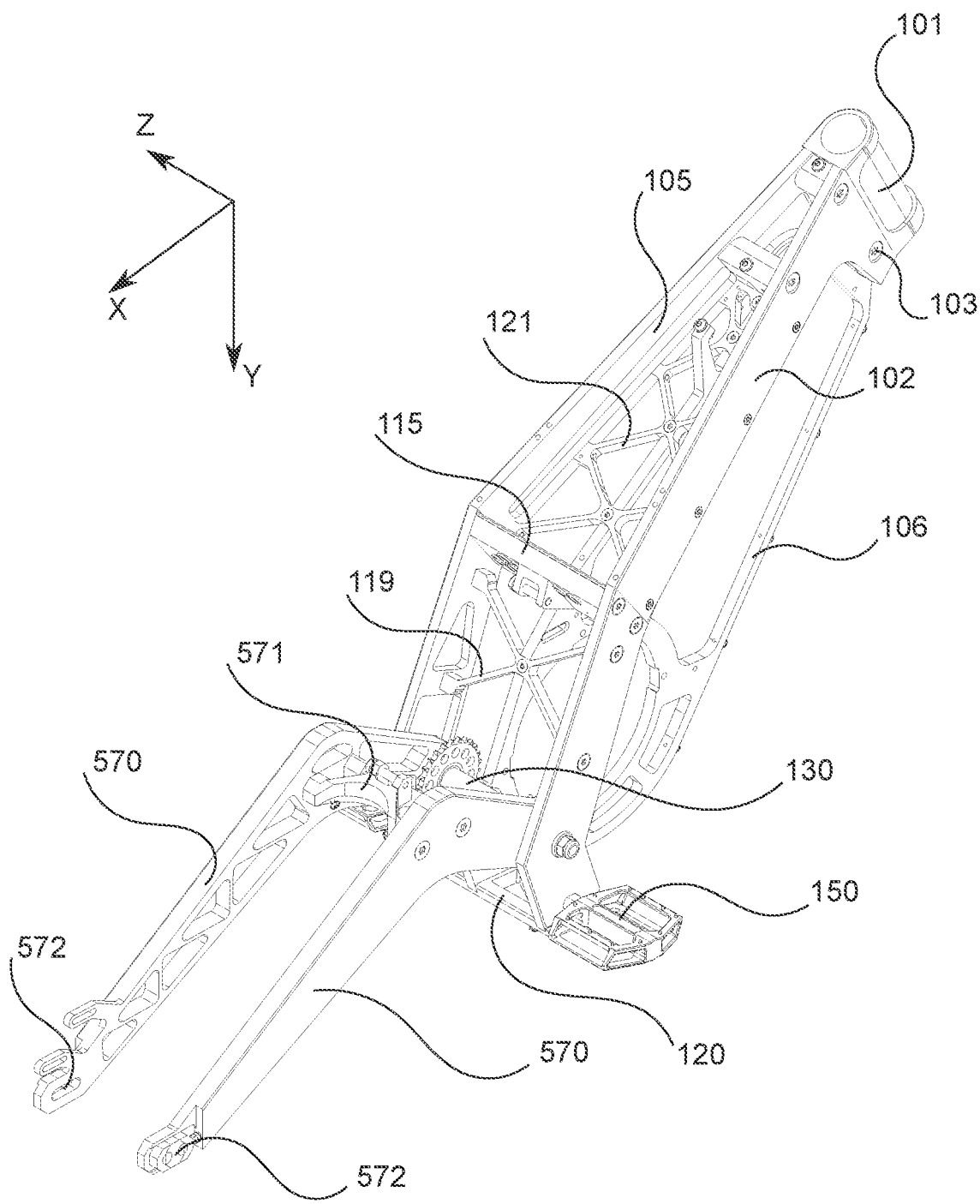
FIG. 5 is a perspective view illustrating a main body frame according to the first embodiment of the present invention in relation to further parts.

FIG. 1 is a side view illustrating an electric motorcycle according to the first embodiment of the present invention which incorporates a main body frame 100 to be described in details below. Pedals 150 for supporting the feet of a driver are attached to either side of the main body frame 100. A pivot stem of a front fork 200 is pivotally loaded to a front fork through hole of the main body frame 100. A battery unit 300 and a motor unit 400 are mounted to the lower side of the main body frame 100. A rear fork 500 is pivotally mounted to the main body frame 100. A seat support 610 is attached to the main body frame and a seat 620 for a driver is supported by the seat support 610 and the main body frame.

The front fork 200 comprises a steering bar 210 on its upper side for steering the motorcycle and front shock absorber(s) 220 on its lower side on which a front wheel 230 is pivotally mounted. The front fork is, for instance, of a dual crown fork type or of a single crown fork type. A front light or reflector can be mounted to the front fork 200. Means for braking, throttling, and, more generally, for controlling the electric motorcycle can be provided on the steering bar 210.

The battery unit 300 mainly supplies power to the motor unit 400 but may also supply power to further functions or units of the electric motorcycle such as lighting or electronic components. The battery unit 300 is removably secured to the main body frame 100 by respective securing means. The securing means can be screws engaging threaded holes in the main body frame 100. Preferably, the battery unit 300 is secured in a way to be quickly fixed and released so as to be easily exchangeable, for instance, with quick-clamping screws or the like. Preferably, the battery unit 300 becomes thinner in width towards its lower end in a downward direction to improve the handling of the electric motorcycle. In particular, pushing the motorcycle becomes easier when it is narrower on its downward side. The battery unit 300 can also be divided in a plurality of smaller battery units. Additional battery units may be arranged at other positions, for instance under the seat.

The motor unit 400 is removably secured to the main body frame 100 by respective securing means and converts electrical to mechanical power for driving the electric motorcycle. The motor unit 400 is preferably placed in a rearward direction X with respect to the battery unit 300 such that a driving chain 590, to be described below, can be made shorter. The motor unit 400 can also be a wheel hub motor arranged at the hub of a rear wheel 530. Thereby, more space for the battery unit 300 can be secured, the motor can be driven at a lower speed of revolution which decreases noise and wear, and the driving chain 590 can be omitted which further decreases noise. However, the center of gravity of the electric motorcycle may be unfavorably shifted, especially with regard to jumping. Alternatively, a wheel hub motor may be placed at each hub of the front wheel 230 and the rear wheel 530. Moreover, the motor unit 400 may be arranged below the main body frame 100 and coupled to the front wheel 230 and the rear wheel 530.

The rear fork 500 comprises a left and a right swingarm 570 which are pivotally mounted to the main body frame 100. A rear shock absorber 580 is removably secured to the rear fork 500 and to the main body frame 100, preferably above the mounting point of the left and right swingarm 570 on the main body frame 100 with respect to a downward direction Y. The driving chain 590 transmits power from the motor unit 400 to a sprocket 510 coupled to the rear wheel 530 which is pivotally mounted to the left and right swingarm 570, so as to drive the electric motorcycle. The sprocket 510 can be coupled directly to the motor unit 400 via the drive chain 590 or mediated by gearing. Alternatively, a primary reduction gearing 130 may be provided between the motor unit 400 and the drive chain 590 so as to reduce the relatively high torque of the electric motor. In this case, the primary reduction gearing may be arranged on a pivot shaft about which the rear fork 500 is pivotally mounted to the main body frame 100, so as to reduce the number of parts. Further chains can be provided as required by the gearing. Directly coupling the motor unit 400 to the sprocket 510 without a primary reduction gearing has the benefit to reduce the number of parts and simplify the construction, whereas the position of the motor unit 400 illustrated in FIG. 1 leads to a more favorable position of the center of gravity of the motorcycle. Other power transmission means may be used instead of chains or sprockets. For instance, a toothed belt may be used instead of driving chain 590. Further details of the rear fork 500 are described below.

The seat support 610 is removably secured to the main body frame 100 by respective securing means. Alternatively, the seat support 610 can be formed by the main body frame 100 itself, for instance, by protrusions of the left and right frame part thereof to be described below. A back light or reflector can be mounted to the seat support 610.

Electronic components (not shown) for controlling the battery and motor unit can, for instance, be arranged in the seat support, under the seat, and between the left and right frame parts of the main body frame. Electronic components can also be arranged under a mountable cover for covering the battery unit 300. The electronic components can also control further units as required, for instance, one or more display and input units for the user to retrieve information about, operate, or maintain the electric motorcycle.

The radius f1 of the front wheel 230 can, for example, be between 28 and 40 cm, preferably between 31 and 37 cm, such as 34 cm. The radius e1 of the rear wheel 530 can, for example, be between 27 and 39 cm, preferably between 28 and 36 cm, such as 30 cm, and is preferably less than the radius f1 of the front wheel 230. In an unloaded state, i.e. without a driver or additional load, the total length a1 of the electric motorcycle can, for example, be between 157 and 217 cm, preferably between 177 and 207 cm, such as 197 cm, but may be adapted as required, for instance, to the size of children. In the unloaded state, the total height b1 of the electric motorcycle can, for example, be between 91 and 131 cm, preferably between 101 and 121 cm, such as 111 cm, but may also be adapted as required. In the unloaded state, the distance c1 between the wheel hubs of the front wheel 230 and the rear wheel 530 in the rearward direction X can, for example, be between 100 and 150 cm, preferably between 120 and 140 cm, such as 130 cm, but may be adapted as required. In the unloaded state, the distance d1 between the lowest point of the main body frame 100 and the ground in the downward direction Y can, for example, be between 27 and 39 cm, preferably between 30 and 36 cm, such as 33 cm, and is preferably about equal to the radius e1 of the rear wheel 530 and/or radius f1 of the front wheel 230.

FIGS. 2, 3, 4, and 5 are views illustrating the main body frame 100 according to the first embodiment of the present invention. The main body frame 100 comprises a steering head 101 (front fork support member) with the front fork through hole for loading the pivot stem of the front fork 200, a right frame part 102, and a left frame part 105. In the illustrated embodiment, the right frame part 102 and the left frame part 105 are secured to the opposite sides of the steering head 101 by securing means 103. The securing means 103 are preferably countersunk head screws which engage threaded holes in the steering head 101 and are received, in the right and left frame parts, by accordingly formed through holes corresponding to the threaded holes.

The main body frame 100 further comprises an upper buffer member (second buffer member) 115 and a lower buffer member (first buffer member) 120 secured to the right and left frame parts by securing means (not shown) and a lower support member 119 and an upper support member 121 arranged between the right and left frame parts and secured to the right and left frame parts by securing means (not shown). The securing means can be of the same kind as the securing means 103.

The main body frame 100 of the illustrated embodiment additionally comprises a central frame part 106 arranged in a central plane P of the main body frame 100 and secured to at least one of, preferably to all of, the steering head 101, the upper buffer member 115, the lower buffer member 120, the lower support member 119, and upper support member 121 by securing means (not shown). The securing means can be of the same kind as the securing means 103.

The steering head 101 is arranged such that an axis of the front fork through hole lies in the central plane P and can be inclined with respect to the downward direction Y. A bearing on which the pivot stem of the front fork 200 is to be loaded, can be arranged in the front fork through hole. The inner diameter of the bearing is, for instance, 44 mm. Preferably, the steering head 101 is removably secured to the left, right, and central frame part so as to be exchangeable. Thereby, the inclination of the axis of the front fork through hole can easily be adjusted.

The right frame part 102 and the left frame part 105 of the main body frame 100 are substantially symmetrical about the central plane P. However, this is not strictly necessary and channels, recessed portions, or pockets may be formed differently on the left and right frame parts, in particular, on the inner faces thereof, for instance, to accommodate electronic components or wiring.

In the following, the right frame part 102 is described in more detail. The description however applies analogously to the left frame part 105.

The right frame part 102 has an elongated shape running from the steering head 101 rearward and downward. The right frame part 102 is formed of an upper part with an upper elongated portion 102a and an upper end portion 102b and a lower part with a lower elongated portion 102c and a lower end portion 102d, the upper and lower parts being respectively arranged at different sides of an elongation direction changing portion 102e, which is preferably a bend of the right frame part, formed such that the upper elongated portion 102a is bend inwardly towards the central plane P. Preferably, the entire upper part bends inwardly towards the central plane P. Thereby, the shape of the electric motorcycle is narrow at the position of the knees of a driver such that handling is improved. A narrow knee position is especially important for providing enough stability and control when driving off-road or jumping. And at the same time, enough space for the battery unit 300 and the motor unit 400 is provided. Moreover, in case a front fork of the dual crown fork type is used, also the necessary front fork movement space is secured for providing a sufficient steering stop limit.

The lower elongated portion 102c can fan out or bend inwardly with respect to the central plane P. It is however preferable that the lower elongated portion 102c runs substantially parallel to the central plane P. It is especially preferable that the lower end portion 102d runs substantially parallel to the central plane P because it is then easier to mount the pedals 150 and the swings arms 570 to the main body frame 100. When the lower elongated portion 102c and the lower end portion 102d run substantially parallel to the central plane P, no further bend is required which makes the part easier to manufacture and reduces costs.

The upper elongated portion 102a can have a width in a direction perpendicular to its direction of elongation and parallel to the central plane P between 4 and 10 cm, preferably between 5 and 8 cm, such as 7 cm. The width can be substantially constant or vary within these ranges over the length of the upper elongated portion 102a. These ranges provide an advantageous relationship between stability and weight. Moreover, enough space for arranging electronic components between the right frame part 102 and the left frame part 105 is secured.

The upper end portion 102b is preferably formed so as to embrace the steering head 101 over its full length. Thereby, the upper end portion 102b can better accept forces during driving and is more durable.

The lower elongated portion 102c can have a width in a direction perpendicular to its direction of elongation and parallel to the central plane P between 5 and 11 cm, preferably between 6 and 9 cm, such as 8 cm. The width can be substantially constant or vary within these ranges over the length of the lower elongated portion 102c. These ranges provide an advantageous relationship between stability and weight.

Preferably, the lower elongated portion 102c is inclined towards the downward direction Y with respect to the upper elongated portion 102a, as seen from a width direction Z perpendicular to the central plane P of the main body frame 100. Thereby, more space for the battery unit 300 and/or motor unit 400 can be secured in the so-formed concave area below the upper elongated portion 102a and the lower elongated portion 102c. An angle β of inclination, as illustrated in FIG. 6, can, for instance, be between 22 and 40°, preferably between 28 and 34°, such as 32°.

The lower end portion 102d can provide means for securing the pedals 150, preferably via threaded holes for engaging a screw portion of the pedals 150. Also, preferably, the lower end portion 102d is further inclined towards the downward direction Y or even opposed to the rearward direction X with respect to the lower elongated portion 102c, as seen from the width direction. Thereby, the length of the upper elongated portion 102a, the lower elongated portion 102c and/or their relative inclination can be adjusted to provide more space for the battery unit 300 and/or motor unit 400 while the pedals 150 can be easily arranged at an ergonomic position.

Figure 6:
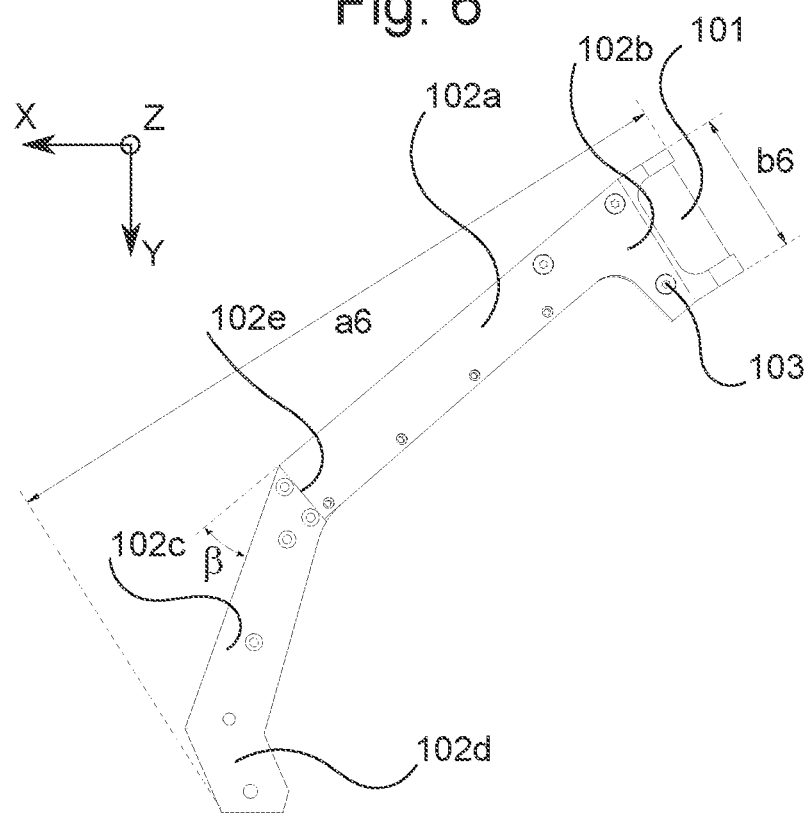
FIG. 6 is a side view illustrating elements of a main body frame according to the first embodiment of the present invention.
Figure 7:
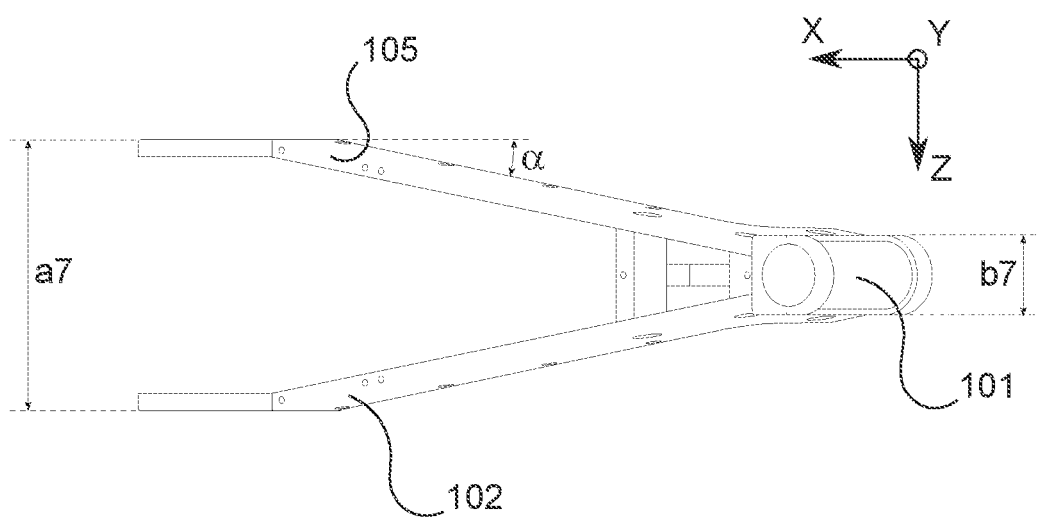
FIG. 7 is a top view illustrating elements of a main body frame according to the first embodiment of the present invention.

As illustrated in FIGS. 6 and 7, The steering head 101 can, for instance, have a length b6 in the direction of the steering axis between 5 and 25 cm, preferably between 10 and 20 cm, such as 15 cm. The overall length a6 of the main body frame 100 can, for instance, be between 53 and 93 cm, preferably between 63 and 83 cm, such as 73 cm.

The width b7 of the steering head 101 in the width direction Z at the position where the pivot stem of the front fork 200 is to be loaded, is one factor of determining the steering stop limit when a front fork of the dual crown fork type is used, and can, for example, be between 4 and 8 cm, preferably between 5 and 7 cm, such as 6 cm.

An angle α of bend under which the upper elongated portion 102a and the lower elongated portion 102c meet at the elongation direction changing portion 102e, preferably being a bend in this direction, as seen in the downward direction Y, can be between 6 and 20°, preferably between 10 to 14°, such as 12°. If the angle is too large, the bend is difficult to make without damaging the part. If the angle is too small, the main body frame 100 is undesirably broad at the knee position of a driver which impairs the handling of the electric motorcycle. At the elongation direction changing portion 102e, the elongation direction of the upper part is hence changed with respect to the elongation direction of the lower part by the angle β of inclination and/or by the angle α of bend.

The largest distance between the right frame part 102 and the left frame part 105 in the width direction Z can be between 10 and 30 cm, preferably between 15 and 24 cm, more preferably between 16 and 22 cm, such as 19 cm. In case the lower parts of the right frame part 102 and the left frame part 105 are parallel to the central plane P, their distance defines said largest distance between the right frame part 102 and the left frame part 105. In these ranges, the overall shape of the main body frame 100 is narrow in the width direction while providing enough space for the battery unit 300 and the motor unit 400. This improves the handling of the electric motorcycle since the overall width thereof is mainly defined by the width of the main body frame 100. It is preferable that at least the width a7 (i.e. the distance between outwardly facing surfaces) of the lower end portions of the right frame part 102 and the left frame part 105 in the width direction Z is between 10 and 30 cm, more preferably between 15 and 24 cm, most preferably between 16 and 22 cm, such as 19 cm. Thereby, an ergonomic distance between the pedals 150, preferably corresponding to that of a bicycle, can be realized.

The right frame part 102 and the left frame part 105 can be provided with recessed portions (cutouts) to further reduce their weight without substantially reducing their mechanical stability or even increasing mechanical stability. Preferably, the recessed portions are formed as pockets on the inside faces of the right frame part 102 and the left frame part 105 facing towards the central plane P. As compared to through holes, such inside-facing pockets do not collect dirt and the electric motorcycle is thus easier to clean. The pockets can have substantially triangular or trapezoidal shape, as seen from the width direction, in view of mechanical stability. The triangular or trapezoidal shapes can have rounded corners and can be overlaid with channels, for instance, for wiring. The depth and the size of the pockets can be adjusted as needed.

The right frame part 102 and the left frame part 105 have a thickness between 3 and 25 mm, preferably between 5 and 20 mm, more preferably between 8 and 15 mm, such as 12 mm. The thickness can be substantially constant. In this context, the thickness is to be understood as the distance between corresponding surfaces facing and opposing the central plane P wherein recessed portions, such as pockets, and individual protrusions are disregarded. A thickness of the right frame part 102 and the left frame part 105 in these ranges can provide enough depth for receiving the heads of countersunk head screws and, at the same time, a low weight, in particular when the frame parts are made from a light metal, a light metal alloy, or a carbon fiber reinforced plastic. Preferably, the right frame part 102 and the left frame part 105 have a rectangular cross section, in which case said thickness corresponds to the shorter side of the rectangle. The rectangular cross section may be provided with cutouts such as the above described recessed portions.

Returning to FIGS. 2, 3, 4, and 5, the upper buffer member 115 and the lower buffer member 120 acts as spacers for holding the distance between the right frame part 102 and the left frame part 105. Means for securing the pedals 150 can be provided on the lower buffer member 120 instead of the lower end portion 102d. The lower buffer member 120 is arranged at the respective lower end portion of the right frame part 102 and the left frame part 105. The upper buffer member 115 is arranged close to the respective bend between the right frame part 102 and the left frame part 105.

The upper buffer member 115 and the lower buffer member 120 are not strictly necessary depending on the rigidity of the right and left frame parts. However, in particular, without the lower buffer member 120 the pedals 150 may not be stably supported with regard to forces between the pedals 150 in the width direction Z. It is preferred that the main body frame 100 comprises both the upper buffer member 115 and the lower buffer member 120 with regard to stability against torsion and shear forces, for instance, exercised by the battery unit 300, the motor unit 400, and the loaded pedals 150 during driving.

The lower support member 119 is arranged between the lower elongated portions of the right frame part 102 and the left frame part 105 in the width direction Z and between the lower buffer member 120 and the upper buffer member 115 in a rearward/downward direction. The upper support member 121 is arranged between the upper elongated portions of the right frame part 102 and the left frame part 105 in the width direction Z and between the upper buffer member 115 and the steering head 101 in the rearward direction X. Both members are not strictly necessary but can greatly enhance the mechanical stability of the main body frame 100 against shear and torsion forces. However, when the motor unit 400 is not mounted to the main body frame 100 but to the hub of the rear wheel 530 and/or front wheel 230, especially the lower support member 119 is not required.

The upper support member 121 is preferably arranged more on a downward side of the upper elongated portions so as to provide a space for electronic component between the right frame part 102 and the left frame part 105 above the upper support member 121. The lower support member 119 can also be arranged on a downward side of the lower elongated portions.

Preferably, each or both of the lower support member 119 and the upper support member 121 have cross-shaped portions connecting opposite sides with respect to the width direction Z. Such portions can provide a high stability against shear and torsion forces while adding only little weight. More preferably, the lower support member 119 has a single cross-shaped portion and the upper support member 121 has multiple, such as three, cross-shaped portions. This leads to a particularly favorable relation between mechanical stability and weight. The lower support member 119 can further be secured to the lower buffer member 120 and/or the upper buffer member 115. The upper support member 121 can further be secured to the upper buffer member 115 and/or the steering head 101.

Figure 8:
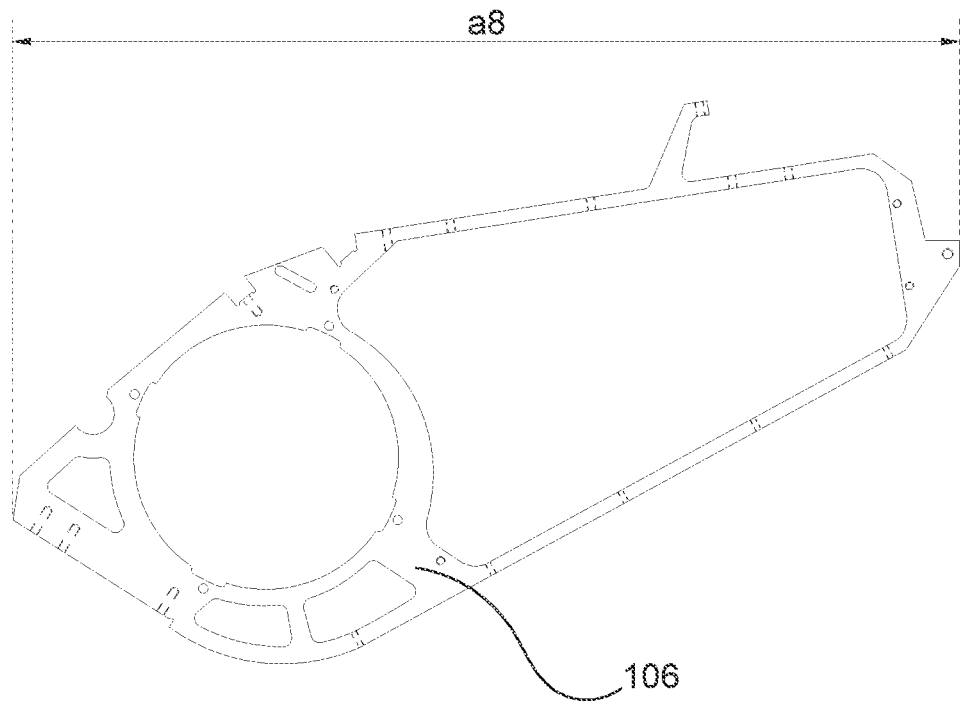
FIG. 8 is a side view illustrating a central frame part according to the first embodiment of the present invention.

The central frame part 106, illustrated in detail in FIG. 8, is arranged in the central plane P of the main body frame 100 and is substantially flat in the width direction Z. Its thickness in the width direction Z can, for instance, be between 3 and 25 mm, preferably between 5 and 20 mm, more preferably between 8 and 15 mm, such as 12 mm.

The central frame part 106 has recessed portions providing space for mounting the battery unit 300 and the motor unit 400. If the motor unit 400 is mounted to the hub of the rear wheel 530, only a recessed portion for mounting the battery unit 300 can be provided. The central frame part 106 can have further recessed portions to reduce its weight as long as sufficient mechanical stability is maintained. Each of the recessed portions can be open or closed as seen from the width direction Z. Preferably, the recessed portions are closed so as to provide further support and protection for the motor unit 400 and the battery unit 300, for instance, against logs or branches that can get caught between the front wheel 230 and the battery unit 300 during off-road driving. When the recessed portions are closed, the central frame part 106 ends in the downward direction Y into a column that is single-stranded in the width direction Z. This allows to make the battery unit 300 more narrow towards the downward direction Y such that the electric motorcycle becomes relatively narrow at this position in comparison to conventional electric motorcycles. This facilitates handling and, in particular, pushing the electric motorcycle. A closed recessed portion for the motor unit 400 can have a mostly circular shape. When respective recessed portions are open, the battery unit 300 and/or the motor unit 400 are supported substantially on their upper side. This can be favorable for smaller and lighter such units.

The overall length a8 of the central frame part 106 can, for instance, be between 52 and 82 cm, preferably between 59 and 75 cm, such as 67 cm. A diameter of the recessed portion for the motor unit 400 can, for instance, be between 12 and 30 cm, preferably between 16 and 24 cm, such as 19 cm.

Figure 9:
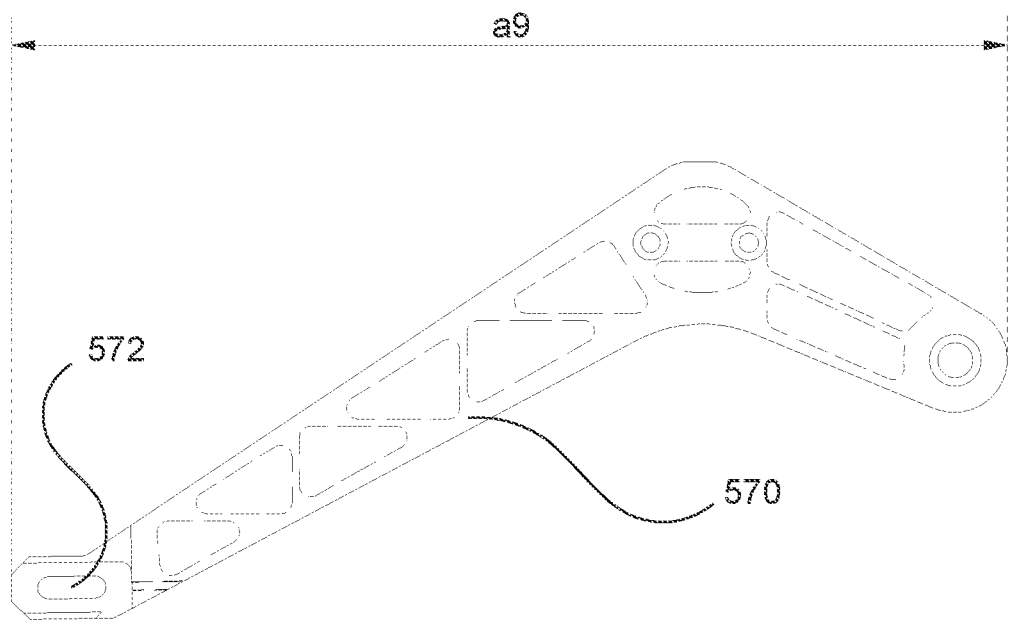
FIG. 9 is a side view illustrating a swing arm according to the first embodiment of the present invention.

The swing arms 570, illustrated in detail in FIG. 9, are arranged substantially parallel to the central plane P of the main body frame 100 and are pivotally mounted to one end thereof via a shaft 140 to corresponding through holes in the lower parts of the right frame part 102 and the left frame part 105. In case the primary reduction gearing 130 is provided, it is preferably arranged on the shaft 140 such that no additional shaft and/or bearing is necessary and the number of parts can be reduced. On another end, a wheel receiver 572 for the rear wheel 530 is provided. The wheel receiver 572 can be adjustable in the rearward direction X and/or downward direction Y. Preferably, a rear fork buffer member 571 is arranged between and secured to the swing arms 570 by securing means (not shown). Thereby, mechanical stability can be improved and the rear shock absorber 580 can easily be mounted to the rear fork buffer member 571.

The swing arms 570 can each be divided into a front part and a rear part. The front part and the rear part can be inclined in the downward direction Y with respect to their intersection. This allows the rear shock absorber 580 and an axis from the wheel receiver 572 of the rear wheel 530 to the steering head 101 to be approximately parallel which can improve the handling of the electric motorcycle, in particular, during jumping and landing.

The overall length a9 of the swing arms 570 can, for instance, be between 40 and 70 cm, preferably between 49 and 59 cm, such as 54 cm.

The overall length a3 of the main body frame 100 together with the swing arms 570 in the unloaded state in the rearward direction X can, for instance, be between 77 and 137 cm, preferably between 97 and 117 cm, such as 107 cm.

The elements (parts, members, and the like) of the main body frame are preferably made from light metals such as aluminum and magnesium and more preferably from light metal alloys such as aluminum and/or magnesium alloys. Most preferably, an aluminum alloy is used, for instance, ALMG4 or aircraft aluminum alloy. In comparison, the density and strength of steel is larger than that of light metals or light metals alloys. Therefore, steel elements can be made thinner and also must be made thinner with regard to their weight. However, thinner elements are more difficult to removably secure to each other since they do not provide threaded holes of appropriate length to sufficiently and reliably engage screws. It is especially difficult to use countersunk head screws since additional depth is required to receive the countersunk heads.

The right frame part 102, the left frame part 105, and the central frame part 106 are preferably solid in the sense that they have no substantially closed cavities. Then, they can easily be manufactured by machining, such as milling, cut-machining, or laser-cutting, raw plates so as to provide the overall shape as well as recessed portions. The right frame part 102 and the left frame part 105 are then bend into shape with a bending tool. Thereby, the necessary post-processing is minimal as compared to casting. The procedure can still be more cost efficient than casting even when the frame parts are to be produced in greater numbers. According to the described procedure, for the right frame part 102 and the left frame part 105, the angle β of inclination is produced in the first step of cut-machining and thereby provided to the raw parts before the angle α of bend is produced by bending the raw parts. The described rectangular cross section of frame parts may be obtained by such manufacture from raw plates.

It is preferable in view of production costs to provide the right frame part 102 and the left frame part 105 each with a single bend. The upper parts of the right and the left frame part then extend in straight manner from the respective elongation direction changing portions 102e up to their attaching portions at the front fork support member 101. However, an additional bend in the upper elongated portion can allow a lower angle of bend a between the upper and the lower part so as to provide more space for the battery unit 300 and the motor unit 400 but makes the main body frame 100 unfavorably wider at the knee position. A further bend between the lower elongated portion and the lower end portion may be provided when the lower elongated portion is not parallel to the central plane of the main body frame 100 so as to make at least the lower end portion parallel thereto.

It is preferable in view of mechanical strength and production cost that the right frame part 102 and the left frame part 105 are each made integrally. Although it is possible to weld respective upper and lower parts together, this required more manual work and has the further short-comings of welding, as described below. Securing upper and lower parts together by screws or adhesives is also possible, but less preferred in view of stability.

The other elements can also be manufactured by machining plates or blocks of material. However, in particular, the steering head 101, the upper buffer member 115, and the lower buffer member 120 can be manufactured by integral casting. Due to their particular shape, these elements are more difficult to machine and integral casting can be especially more cost efficient in larger quantities. Also, the upper support member 121 and the lower support member 119 may be integrally cast. All of these elements may also be cast in multiple raw parts which are then attached to each other, for instance by welding, adhesives, or screws. In view of costs and stability it is however more preferred to manufacture each element integrally. Moreover, all elements can be manufactured by 3D-printing. In case of 3D-printing, substantially closed cavitied can be provided to further reduce weight. However, when elements are to be removably secured to each other by screws, substantially solid portions for providing threaded portion to engage the screws or to receive the screws are preferably provided at the respective elements in view of stability.

Elements formed from light metals or light metal alloys are preferably anodized. Anodizing is an electrolytic passivation process used to increase the thickness of the natural oxide layer on the surface of metal parts. For instance, aluminum alloys can be anodized to increase corrosion resistance and allow dyeing or improved adhesion by a known eloxal method (electrolytic oxidation of aluminum) so as to form a protective oxide layer of strength of 5 to 25 μm. Other light metals and light metal alloys can be anodized similarly. To ensure a homogenous oxide layer, it is preferable to anodize each element before assembly. Alternatively, the elements can be painted or left untreated.

Alternatively to light metals and light metal alloys, some or all elements of the main body frame 100 can be made from plastics, especially carbon fiber reinforced plastics (CFRP). Such plastics are light and strong. In case of manufacturing by 3D-printing, metals and plastics suitable for 3D-printing can be used.

Preferably, the right and left frame parts 102 and 105, the front fork support member 101, and/or the first buffer member 120 are made from a light metal, a light metal alloy, or carbon fiber reinforced plastic.

Figure 10:
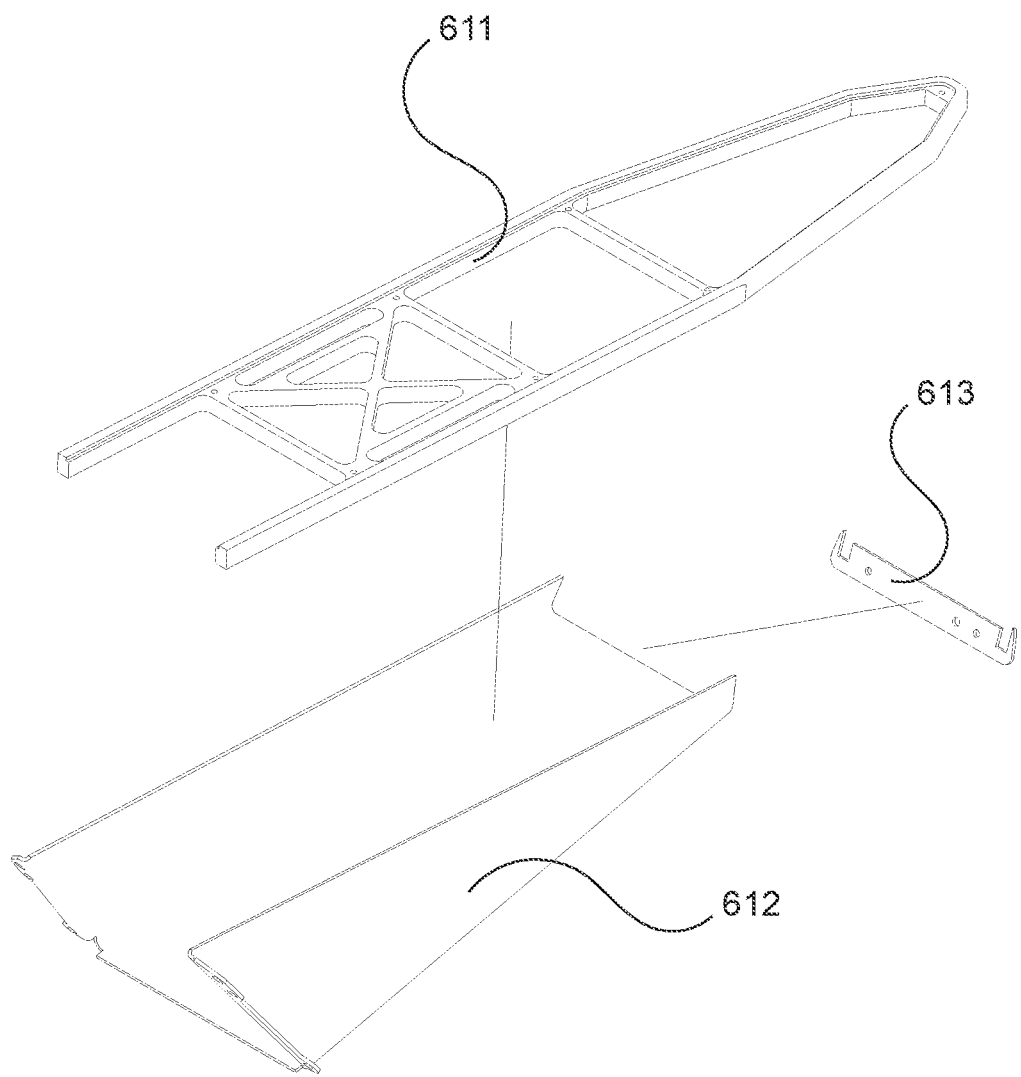
FIG. 10 is an exploded perspective view illustrating a saddle support according to the first embodiment of the present invention.

FIG. 10 is a view illustrating the saddle support 610 comprising saddle support frame 611, saddle support downward cover 612, and saddle support rearward cover 613. The saddle support downward cover 612 can be formed from a light metal or light metal alloy so as to support the weight of the saddle 620 and a driver. Then, at least the saddle support downward cover 612 is mounted to the main body frame 100 by securing means. The saddle can be mounted to the saddle support frame 611 by further securing means.

Alternatively, a saddle support or elements thereof can be integrally formed by the main body frame 100, in particular, by respective protrusions of the right frame part 102 and the left frame part 105.

A weight of a main body frame of 15 kg or more makes an electric motorcycle difficult to handle, in particular, in view of off-road usage, jumping, transport, and lifting. Hence, a lower weight is preferable. The main body frame 100 according to the present invention (as illustrated in FIGS. 2 to 5 but without swingarms 570 and pedals 150), can achieve a weight of less than 10 kg. When the frame is provided with pockets, even a weight as low as 6 kg can be achieved without substantially reducing its structural strength. The described shape, manufacture, and/or materials lead to such low weight. Due to the low weight of the main body frame 100, further components require less strength and can thus be made lighter so as to further reduce the overall weight of the electric motorcycle. For instance, the wheels 230 and 530, the swing arms of the rear fork 500, and the shock absorbers 220 and 580 can be made lighter, either by conventional means or, more preferably, by preferred features of the present invention. Thereby, it is possible to achieve a low overall weight of the electric motorcycle, below 60 kg, for instance, 45 kg.

Preferably, the securing means for removably securing elements (parts, members, units, or the like) to each other can be screws and optionally, washers between the elements. Then, one element comprises a through hole for the screw and the other element comprises a corresponding threaded hole for engaging the screw. More preferably, the screw is a countersunk head screw and the through hole is formed so as to receive the countersunk head. It is in particular preferred that the elements of the main body frame 100 are secured to each other by countersunk head screws via respective holes and through holes of the elements. This makes cleaning of the electric motorcycle easier as compared to protruding screw heads. When elements are removably secured to each other, the elements can easily be replaced when they are damaged or need to be adjusted. For instance, by replacing the steering head 101, the inclination of the front fork through hole for loading the pivot stem of a front fork 200 can be adjusted. This provides the motorcycle with a modular design that allows adaptation to different driving situations without substantial redesign of essential parts such as the main body frame.

Some elements or even all elements which need to be fixed to each other, may be secured by other means, for instance, by adhesives or by welding. However, in particular, welding is less preferred since it can cause thermal damage to the elements and their surface. Welding, for instance, damages a protective anodization of the elements. Also nuts and bolts may be used as some or all securing means. However, the nuts may loosen and they protrude from the elements which are thus more difficult to clean.

Moreover, securing some or all elements to each other may be achieved by manufacturing these elements integrally as a single integral element. Such integral elements can be produced by machining a block of material, integral casting, or by 3D-printing.

Wheels for the electric motorcycle comprise spokes and tires and may be conventional motorcycle wheels. In view of the overall weight of the electric motorcycle, lighter wheels are preferred. Due to low weight of the main body frame 100 and thus the low overall weight of the electric motorcycle of the present invention, it is possible to combine motorcycle spokes with bicycle tires which are lighter than motorcycle tires, to further reduce the overall weight of the electric motorcycle.

The battery unit 300 and the motor unit 400 are configured to output and convert a peak power of 3 kW or more, preferably 5 kW or more, for instance 10 kW. According to the first embodiment of the present invention, enough space for a motor unit 400 with a large diameter, for instance, with a diameter between 12 and 30 cm, such as 19 cm, can be secured by the particular shape of the main body frame 100. The motor unit 400 preferably has a high torque and a narrow width. The motor unit 400 is preferably short in axial direction, in particular shorter than the maximum width of the main body frame 100.

Second Embodiment

In the first embodiment, as illustrated in FIG. 1, an electric motor cycle is described in which the motor unit 400 is removably secured to the main body frame 100 and placed in a rearward direction X and/or downward direction Y with respect to the battery unit 300. In order to secure more space for the battery unit 300, a motor unit can instead be arranged at the hub of the rear wheel 530 and/or at the hub of the front wheel 230. However, such an arrangement can unfavorably shift the center of gravity of the electric motorcycle, especially with regard to jumping.

The second embodiment differs from the first embodiment mainly by an arrangement of the motor unit 400 due to which more space can be provided for the battery unit 300 and an unfavorable shift of the center of gravity of the electric motorcycle can be avoided. The following description of the second embodiment focuses on the differences to the first embodiment. In particular, the description of the features or preferred features which are essentially the same as in the first embodiment is omitted.

Figure 11:
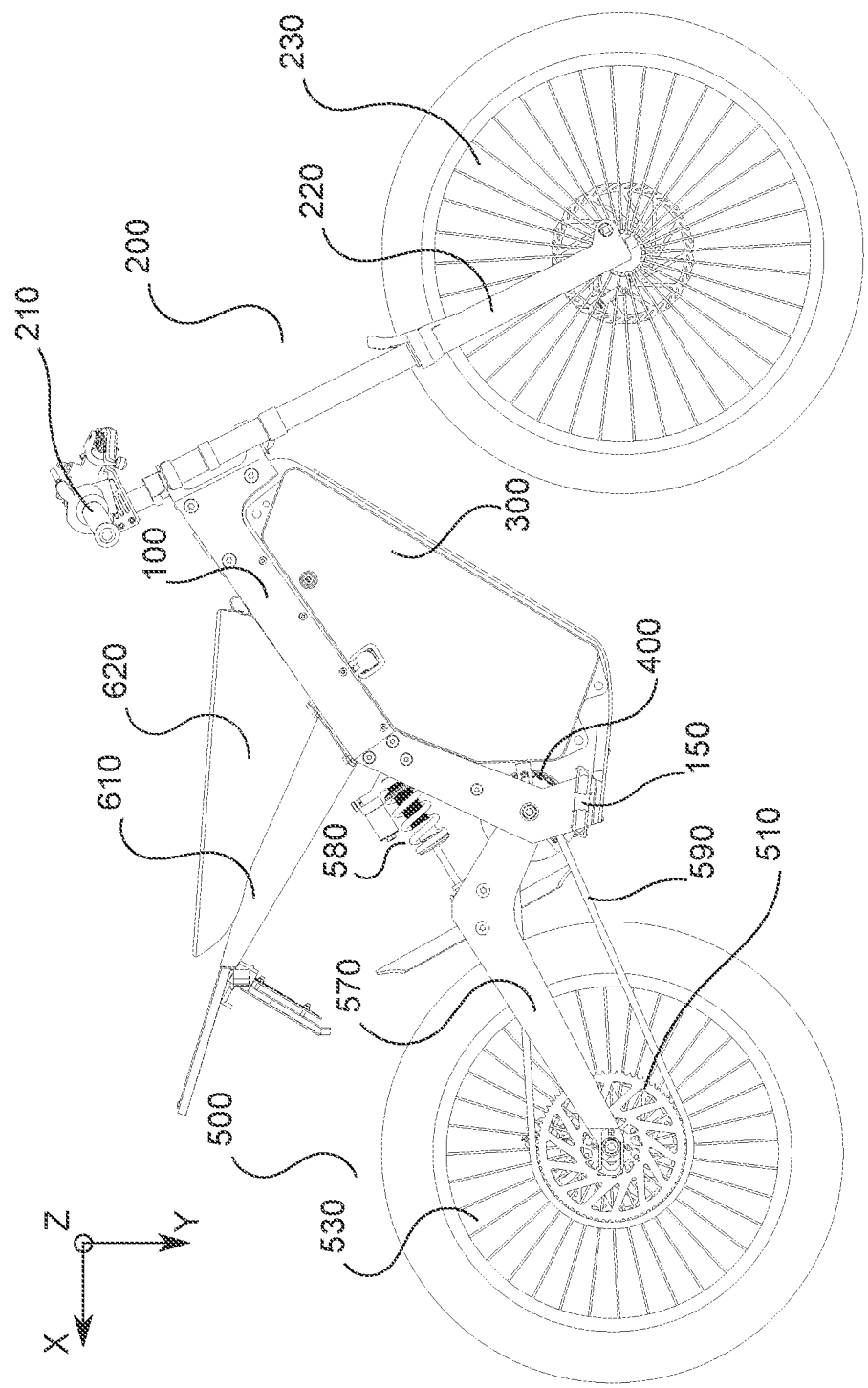
FIG. 11 is a side view illustrating an electric motorcycle according to a second embodiment of the present invention.

FIG. 11 is a side view illustrating an electric motorcycle according to the second embodiment of the present invention. The same or corresponding parts, members, units, and the like are denoted by the same reference numerals as in the first embodiment. Similar to the first embodiment, the battery unit 300 and the motor unit 400 are mounted to the lower side of the main body frame 100. The motor unit 400 is placed in a rearward direction X with respect to the battery unit 300 on a pivotal mounting axis of the swing arms 570. The battery unit 300 can be increased in size compared to the first embodiment and thereby also in capacity.

Figure 12:
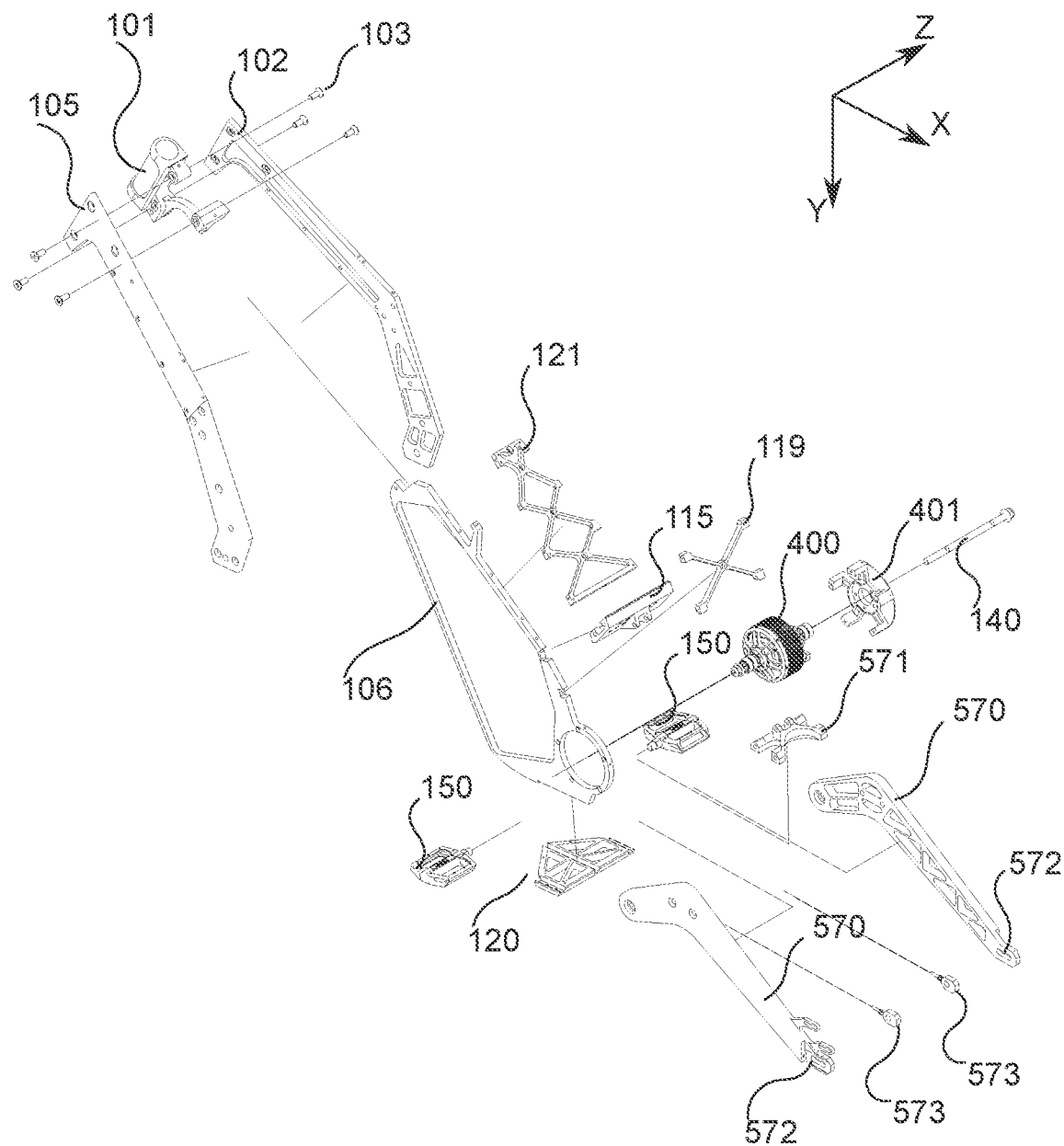
FIG. 12 is an exploded perspective view illustrating a main body frame and an arrangement of a motor unit according to the second embodiment of the present invention in relation to further parts.

FIG. 12 is an exploded perspective view illustrating the main body frame 100 and the arrangement of a motor unit 400 according to the second embodiment of the present invention in relation to further parts. Different from the first embodiment, the motor unit 400 is arranged on the pivotal axis about which the swing arms 570 are pivotally mounted to the lower parts of the right frame part 102 and the left frame part 105 via the shaft 140. The motor unit 400 is mounted to the shaft 140 and is removably secured to the central frame part 106 of the main body frame 100 via a motor unit retaining element 401 by securing means (not shown).

In FIG. 12, the wheel receivers 572 are adjustable in the rearward direction X and/or downward direction Y by respective preload elements 573, e.g. in the form of carriages which can be used to tighten the driving chain 590. The preload elements 573 can be used with same function in the first embodiment as well.

Figure 13:
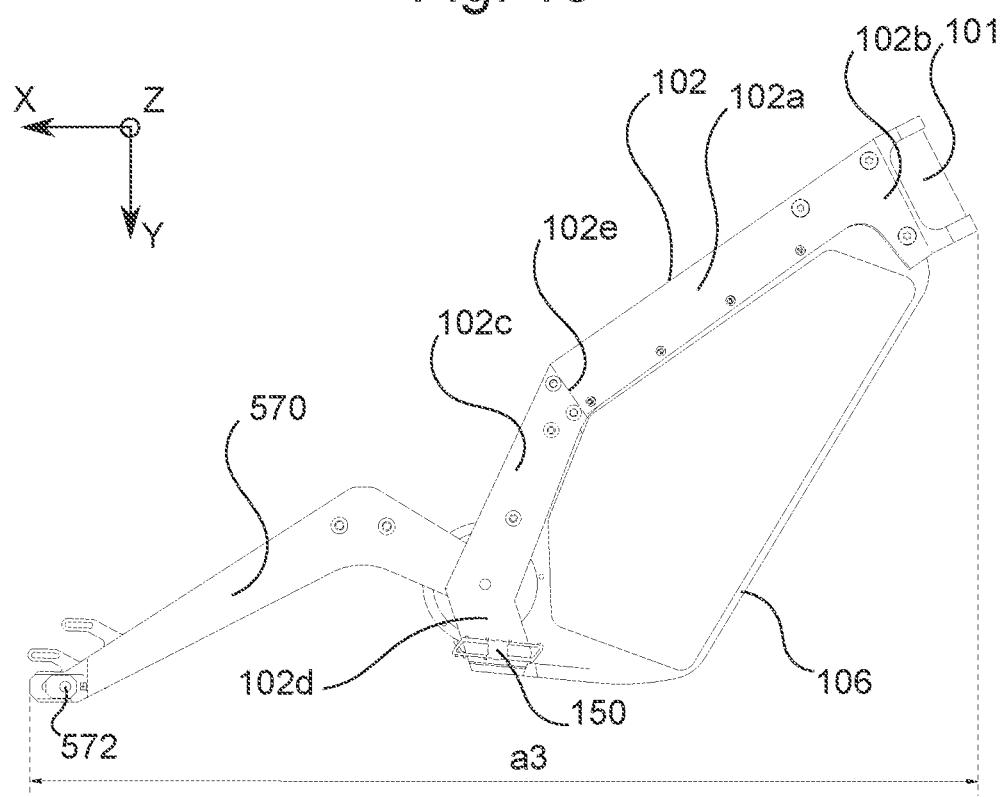
FIG. 13 is a side view illustrating a main body frame according to the second embodiment of the present invention in relation to further parts.
Figure 14:
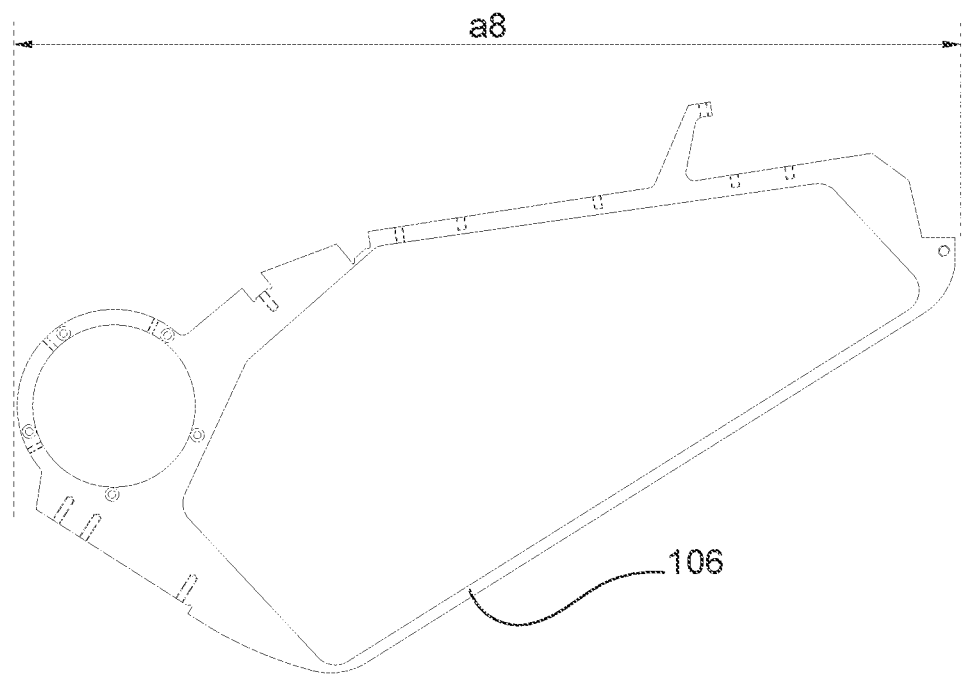
FIG. 14 is a side view illustrating a central frame part according to the second embodiment of the present invention.

FIGS. 13 and 14 are views illustrating the main body frame 100 and the central frame part 106 thereof according to the second embodiment of the present invention. Compared to the first embodiment, in the central frame part 106, the recessed portion for mounting the motor unit 400 is shifted in a rearward direction, preferably to a rear-most portion of the central frame part 106, onto a position corresponding to the pivotal axis of the swing arms 570 between the left and the right frame parts. In other words, the main body frame 100 of the second embodiment is adapted, in particular via its central frame part 106, such that the motor unit and the swing arms can be mounted on a common axis. This, allows the recessed portion for mounting the battery unit 300 to take up almost the entire area of the central frame part 106 below the right frame part 102 and the left frame part 105, as allowable in view of stability and of providing sufficient portions for securing the battery unit 300.

Since the motor unit 400 is placed at a substantially central position of the electric motorcycle along the forward/rearward direction, the center of gravity thereof is not unfavorably shifted. Moreover, the primary reduction gearing 130 can be omitted and the motor unit 400 can be directly coupled to the sprocket 510 via a short driving chain 590 so as to decrease the number of parts and noise. Such driving chain 590 is also not subject to any distance changes between motor unit 400 and sprocket 510 when the swing arms 570 are pivoted compared to the main body frame 100 since this distance is defined by the size of the swing arms 570. In addition, since the motor unit 400 is sandwiched between the right frame part 102 and the left frame part 105, further protection against damage and dirt is provided.

In view of securing more space for the battery unit 300, a motor unit 400 with a small diameter between 5 and 20 cm, preferably between 7 and 16 cm, such as 11.2 cm, can be used. Such a small diameter motor unit with high torque and high peak power conversion of 3 kW or more, preferably 5 kW or more, such as 10 kW or more, is not commonly used in the field of electric motorcycles but is known in the field of model aircrafts. A suitable motor unit from the field of model aircrafts can be used as is or can be specifically adapted for use in electric motorcycles. Examples of such motor unit are a Hacker Q-80, Hacker Q-100, or a Hacker Q-150. Such motor unit can also be used in the first embodiment. As in the first embodiment, the motor unit 400 is preferably short in axial direction, in particular shorter than the maximum width of the main body frame 100. Preferably the width in axial direction is between 2 and 15 cm, more preferable between 2.5 and 7 cm, such as 6.8 cm. The recessed portion of the central frame part 106 for mounting the motor unit 400 is preferably adapted to the diameter of the motor unit 400.

While the arrangement of the motor unit 400 according to the second embodiment is favorably combined with the (preferred) features of the first embodiment, especially with the main body frame 100 of the first embodiment, it is not limited thereto and the particular arrangement of the motor unit 400 can also be favorably applied to an electric motorcycle with a conventional main body frame. That is, an electric motorcycle may be favorably provided, which comprises a main body frame preferably with pedals mounted thereto, a seat support mounted to the main body frame, preferably a seat mounted to the seat support, a rear fork comprising swing arms and a rear wheel pivotally mounted to the swing arms which are in turn pivotally mounted to the main body frame at the lower parts of the right and left frame part, a front fork comprising a front wheel and being pivotally loaded a the front fork support member of the main body frame, a motor unit mounted to the main body frame and coupled to the rear wheel, and preferably a battery unit mounted to the main body frame, wherein the motor unit is arranged on a pivotal axis on which the swing arms are pivotally mounted to the main body frame.

In such electric motorcycle, the motor unit preferably comprises a hollow shaft through which the pivotal axis extends, at which the swing arms are pivotally mounted to the main body frame, wherein the hollow axis is arranged rotatably relative to the pivotal axis. More preferably, the motor unit comprises a fixed part which is mounted to the main body frame so as not to rotate relative thereto and a driving part which is rotatable relative to the fixed part and coupled to the rear wheel for driving the rear wheel, and the motor unit is arranged such that the pivotal axis on which the swing arms are mounted is rotatable relative to both the fixed part and the rotatable part of the motor unit. Such motor unit arrangement provides a configuration which is particularly stable with respect to shear forces acting at the pivotal axis.

Figure 15:
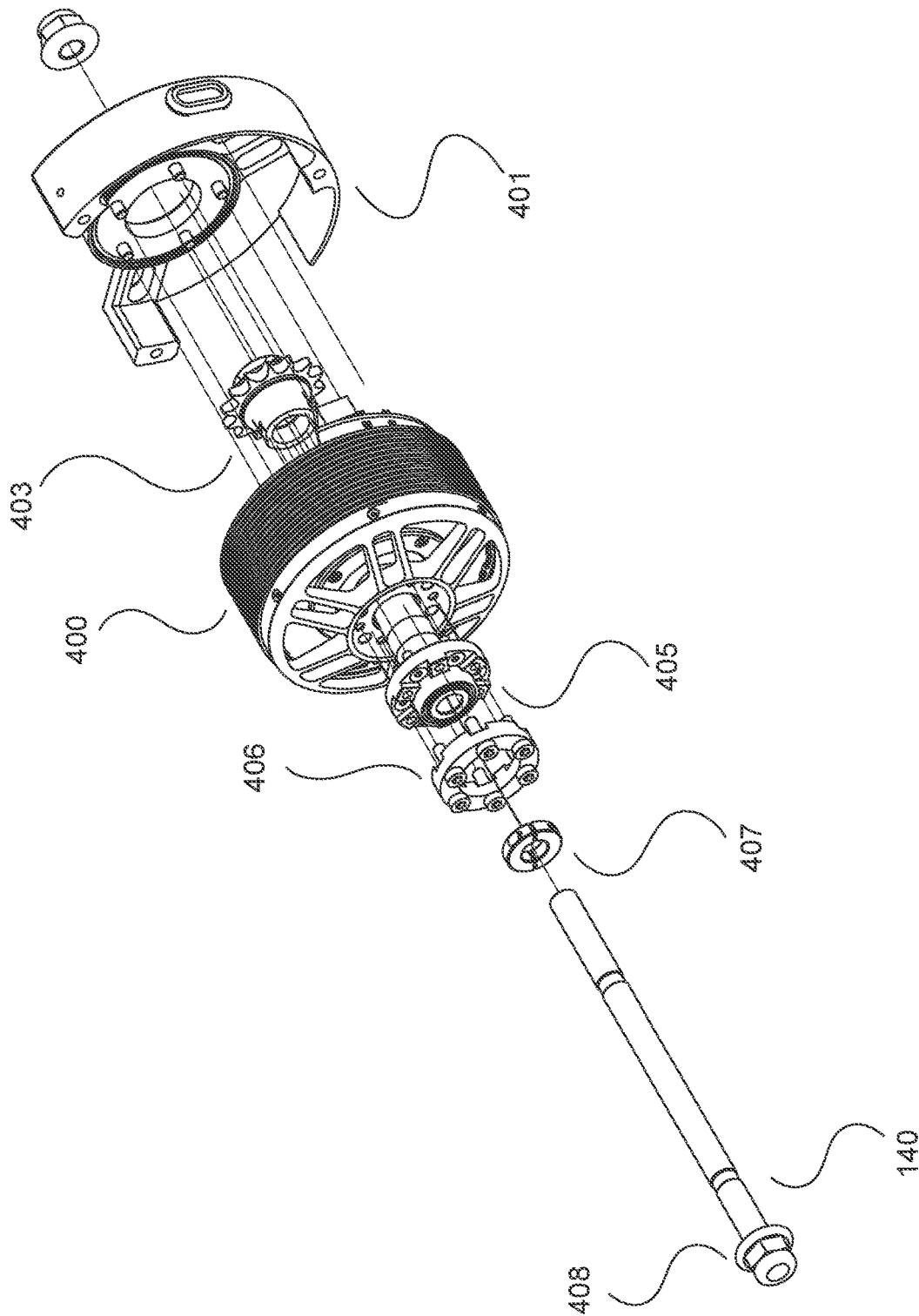
FIG. 15 is an exploded perspective view illustrating an arrangement of a motor unit according to the second embodiment of the present invention on a pivotal axis.
Figure 16:
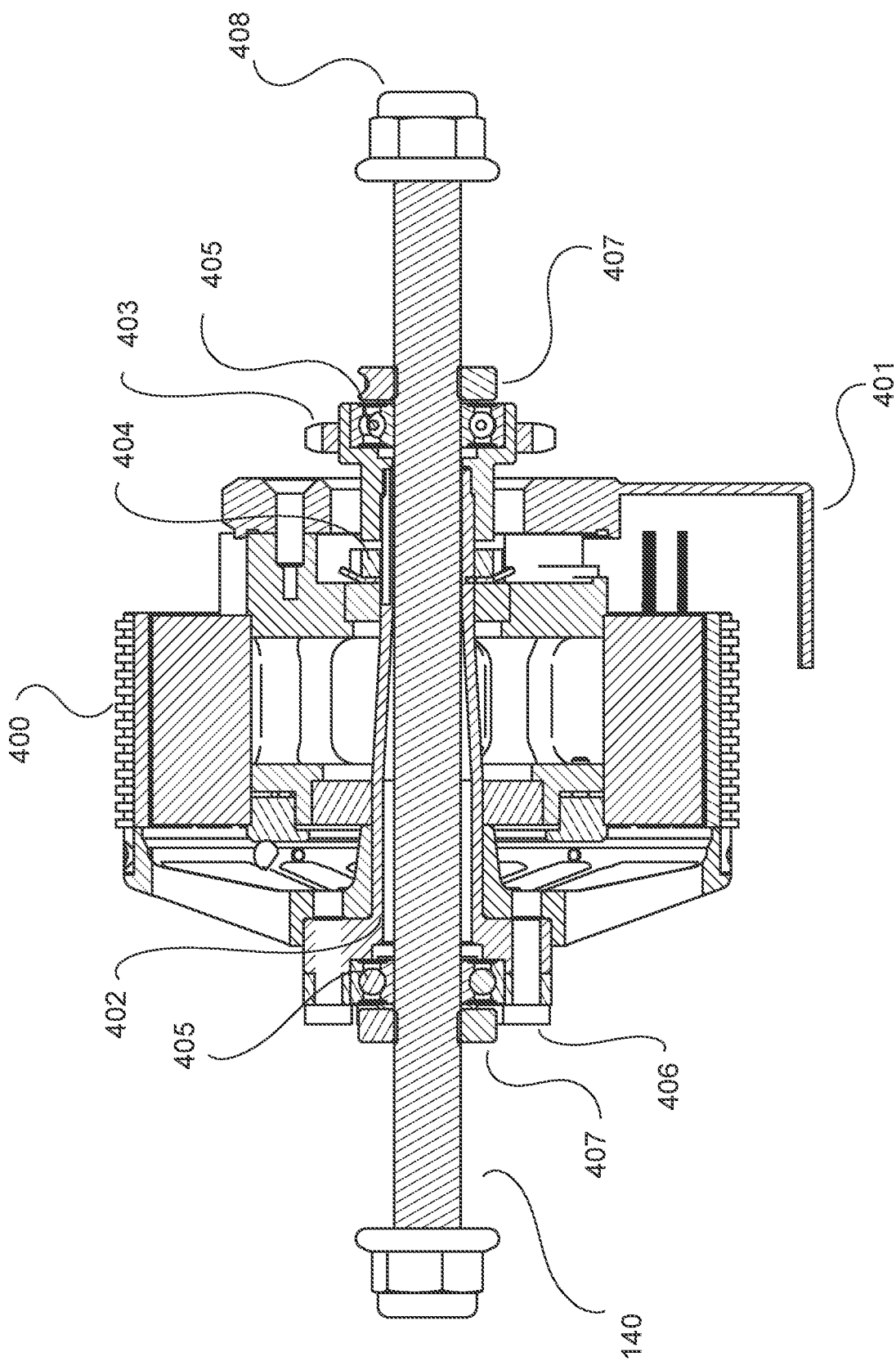
FIG. 16 is a cross-section view along a pivotal axis illustrating a motor unit according to the second embodiment of the present invention on the pivotal axis.

FIGS. 15 and 16 are views illustrating such arrangement of the motor unit 400 on the pivotal axis. The motor unit retaining element 401 removably secures the motor unit 400, in particular the fixed part thereof, to the main body frame 100. The driving part of the motor unit 400 comprises a hollow shaft 402 which is coupled with a drive sprocket 403 using a locknut 404, and the drive sprocket 403 is further coupled to the rear wheel 530 via the driving chain 590. The pivotal axis defined by the shaft 140 via which the swing arms 570 are pivotally mounted to the main body frame 100 extends through the hollow shaft 402 and the drive sprocket 403. The hollow shaft 402 is provided with a ball bearing 405 which is secured by a securing ring 406, and the drive sprocket 403 is provided with a corresponding ball bearing 405. The ball bearings 405 allow both the hollow shaft 402 and the drive sprocket 403 to rotate relative to the shaft 140/pivotal axis. The positions of the hollow shaft 402 and the drive sprocket 403 with their respective ball bearings 405 are removably secured with respect to the shaft 140 by shaft positioning rings 407. The shaft 140 is further removably secured to the swing arms 570 by axis nuts 408.

Figure 17:
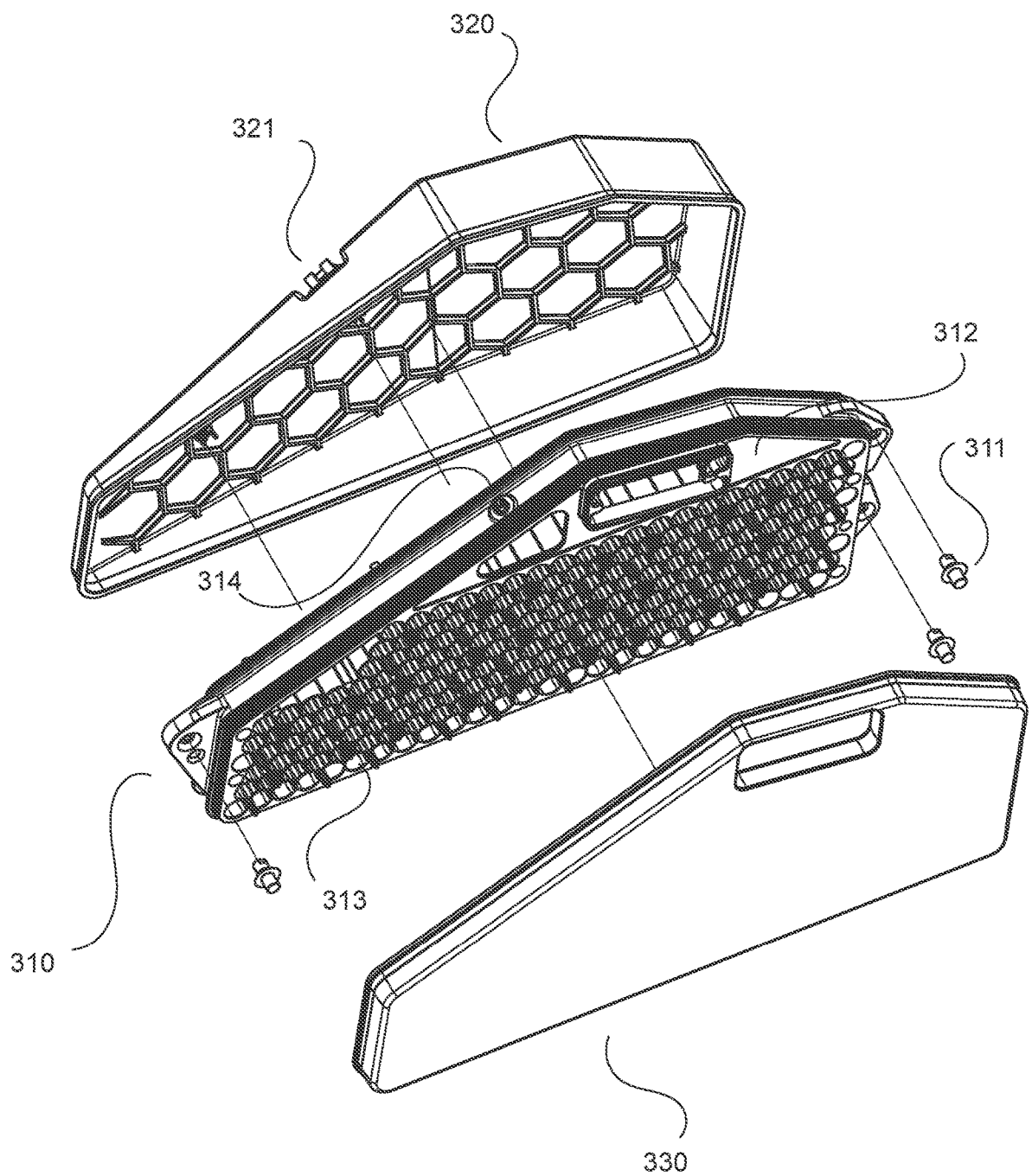
FIG. 17 is an exploded perspective view illustrating a battery unit according to the second embodiment of the present invention.

FIG. 17 is a view illustrating the battery unit 300 according to the second Embodiment in further detail. The battery unit 300 comprises a cell carrier 310 and first and second case covers 320, 330 removably attached on both sides thereof. The cell carrier 310 can be removably secured to the main body frame 100, in particular the central frame part 106 thereof, via alignment bolts 311, preferably at least at three positions.

The cell carrier 310 comprises a plate member 312 with through holes 313 into which battery cells (not shown) can be removable mounted and then contacted from both sides of the cell carrier 310 to become interconnected. The through holes are arranged in a two-dimensional array. Preferably, the through holes 313 have circular cross sections, and further preferably, they are arranged in a hexagonal or centered rectangular lattice. The through holes 313 are adapted to allow battery cells of corresponding outer diameter to be mounted tightly while considering thermal expansion and manufacturing inaccuracies. To this end, the inner diameter of the through holes 313 is slightly larger than the outer diameter of the intended battery cells, preferably by 5 to 20% of the diameter of the battery cells, more preferably by at least 10%. Useable battery cells are for example Li-Ion batteries of the type 18650, having a circular cross section, a nominal diameter of 18 mm, a nominal length of 65 mm, and actual values which may slightly differ therefrom. If battery cells of such type with an actual diameter of 18.4 to 18.5 mm are used, the diameter of the through holes 312 can be between 18.4 and 18.7 mm, preferably between 18.5 and 18.6 mm, such as 18.6 mm.

Groups of battery cells can be connected in parallel, preferably adjacent ones to minimize contacting distances, and such parallelized groups can be further connected in series. The cell carrier 310 preferably comprises a number of through holes 313 which is an integer multiple of the intended number of battery cells in each parallelized group, which can be between 200 and 230 through holes 313, such as 210. The total capacity of the battery unit 300 can be between 30 and 90 Ah, preferably between 40 and 80 Ah. For example 210 battery cells of said type 18650 with a capacity of 3000 mAh for each battery cell can be split into groups of 15 cells which are connected in parallel within each group, and the resulting 14 groups can be connected in series to obtain a battery unit with a total capacity of 45 Ah and an energy content of 2630 Wh.

The through holes 313 guide mounted battery cells via their inner walls along the entire depth of the through holes 313, i.e. the thickness of the plate member 312, which is preferably smaller than the length of the battery cells. The thickness of the plate member 312 can be between 30 mm and 80 mm, preferably between 40 mm and 70 mm, such as 46 mm. The portions of the plate member 312 between adjacent holes have a thickness in the array plane at the thinnest positions which is selected to provide sufficient stability, preferably they have a thickness of at least 0.8 mm. Such arrangement provides a stable positioning, easy mounting, and good heat transfer for the battery cells.

Suitable materials for the cell carrier 310 and the plate member 312 are electrically insulating and providing good mechanical stability. Preferably, the plate member 312 is casted or 3D printed and made of a material that can be processed in such way, more preferably plastics or carbon fiber reinforced plastics. The first and second case covers 320, 330 protect the inner parts of the cell carrier 310 from the environment and can be made of the same material as the plate member 312. A charging socket 321 in the first case cover 320 allows the battery unit 300 to be charged. The cell carrier 310 can be provided with a valve 314 for allowing pressure regulations in a cavity encompassing the battery cells, which is formed when the first and second case covers 320, 330 are mounted to the cell carrier 310.

The described battery unit 300 according to the second embodiment can equally be used in the first embodiment, especially with an electric motorcycle having the main body frame 100 of the first embodiment. Moreover, it is not limited to be used for an electric motorcycle according to the first and second embodiments and can also be favorably applied to an electric motorcycle with a conventional main body frame and/or conventional motor unit arrangement, the more so as it is an exchangeable part. That is, a battery unit may be favorably provided, which comprises a cell carrier with a plate member having through holes arranged in a two-dimensional array, into which battery cells can be inserted and contacted from both sides.

The invention claimed is:

1. A main body frame for an electric motorcycle, comprising:
   a front fork support member with a front fork through hole for loading a pivot stem of a front fork, the front fork through hole having a pivotal axis arranged in a central plane of the main body frame,
   a right and a left frame parts arranged on opposite sides of the central plane of the main body frame, each having an elongated shape and being formed of an upper part and a lower part, respectively at different sides of an elongation direction changing portion,
   a first buffer member attached, at opposite sides thereof, to the right and left frame parts, and crossing the central plane, wherein
   starting from the respective elongation direction changing portions thereof, the upper parts of the right and left frame parts extend inwardly towards the central plane so as to embrace the front fork support member, and are attached to opposite sides of the front fork support member,
   a largest width of the main body frame in a width direction perpendicular to the central plane is 10 cm or more and 30 cm or less,
   the elongation direction changing portions are bends of the right and left frame parts,
   the lower parts of the right and left frame parts are inclined in a downward direction with respect to the elongation direction of the upper parts of the right and left frame parts, different from the width direction, whereby a concave area for a battery unit is formed below the upper and lower parts of the right and left frame parts,
   the main body frame further comprises a central frame part arranged in the central plane of the main body frame and having a recessed portion for mounting the battery unit below the right and left frame parts,
   wherein the central frame part is attached to at least one of the members of the main body frame.

2. The main body frame according to claim 1, wherein a width of the main body frame at lower end portions of the right and left frame parts in the width direction is 10 cm or more and 30 cm or less.

3. The main body frame according to claim 1, wherein the lower parts of the right and left frame parts extend in parallel to the central plane of the main body frame.

4. The main body frame according to claim 1, wherein
   the upper part of each of the right and left frame parts has a width of between 4 and 10 cm in a direction perpendicular to its respective direction of elongation and parallel to the central plane, and/or
   the lower part of each of the right and left frame parts has a width of between 5 and 11 cm in a direction perpendicular to its respective direction of elongation and parallel to the central plane.

5. The main body frame according to claim 1, wherein each of the right and left frame parts has a thickness of 3 mm or more and 25 mm or less.

6. The main body frame according to claim 1, wherein each of the right and left frame parts is obtainable by machining a raw plate into a raw part and bending the raw part into the shape of the respective frame part with a bending tool.

7. The main body frame according to claim 1, further comprising a second buffer member acting as a spacer between the right and left frame parts and being attached, at opposite sides thereof, to the lower parts of the right and left frame parts so as to be arranged between the right and left frame parts close to the respective elongation direction changing portions thereof and,
   wherein the first buffer member is attached to respective end portions of the lower parts of the right and left frame parts.

8. The main body frame according to claim 1, further comprising an upper support member for providing support in the width direction, arranged between and attached to the respective upper parts of the right and left frame parts at opposite sides thereof.

9. The main body frame according to claim 8, wherein the upper support member has at least one cross-shaped portion which is attached to the right and left frame parts at opposite end portions of its cross-shape.

10. The main body frame according to claim 1, wherein the upper parts of the right and left frame parts extend in straight manner from the respective elongation direction changing portions up to their attaching portions at the front fork support member.

11. The main body frame according to claim 1, wherein the recessed portion of the central frame part for mounting the battery unit is closed on a downward side thereof by a column which is single-stranded in the width direction.

12. The main body frame according to claim 1, wherein the front fork support member and the first buffer member, are removably secured to the right and left frame parts.

13. An electric motorcycle, comprising:
   the main body frame according to claim 1 with pedals mounted thereto;
   a seat support mounted to the main body frame;
   a seat mounted to the seat support;
   a rear fork comprising swing arms and a rear wheel pivotally mounted to the swing arms which are in turn pivotally mounted to the main body frame at the lower parts of the right and left frame parts;
   the front fork comprising a front wheel and being pivotally loaded in the front fork support member of the main body frame;
   a motor unit mounted to the main body frame or the rear fork and coupled to the rear wheel; and
   the battery unit mounted to the main body frame.

14. The electric motorcycle according to claim 13, wherein the motor unit is mounted to the main body frame and arranged on a pivotal axis about which the swing arms are pivotally mounted to the main body frame.

* * * * *